(12) United States Patent
Cocchi et al.

(10) Patent No.: US 9,402,408 B2
(45) Date of Patent: Aug. 2, 2016

(54) MACHINE FOR MAKING AND DISPENSING SEMILIQUID AND/OR SEMISOLID PRODUCTS

(75) Inventors: Andrea Cocchi, Calderara di Reno (IT); Roberto Lazzarini, Reggio Emilia (IT)

(73) Assignee: ALI S.p.A—CARPIGIANI GROUP (IT)

( * ) Notice: Subject to any disclaimer, the term of this patent is extended or adjusted under 35 U.S.C. 154(b) by 1092 days.

(21) Appl. No.: 13/415,451

(22) Filed: Mar. 8, 2012

(65) Prior Publication Data

US 2012/0251697 A1    Oct. 4, 2012

(30) Foreign Application Priority Data

Mar. 30, 2011    (IT) ............... BO2011A0165

(51) Int. Cl.
| | | |
|---|---|---|
| *A23C 3/04* | (2006.01) | |
| *A23G 9/04* | (2006.01) | |
| *A23G 9/28* | (2006.01) | |
| *A23G 9/20* | (2006.01) | |

(52) U.S. Cl.
CPC ........ *A23G 9/045* (2013.01); *A23G 9/28* (2013.01); *A23G 9/20* (2013.01)

(58) Field of Classification Search
CPC ........... A23G 9/08; A23G 9/086; A23G 9/14; A23G 9/16; A23G 9/163; A23G 9/166; A23G 9/20; A23G 9/22; A23G 9/228; A23G 9/28; A23G 9/283; A23G 9/30
USPC ........................................ 99/323.1, 452, 455
See application file for complete search history.

(56) References Cited

U.S. PATENT DOCUMENTS

| | | | |
|---|---|---|---|
| 3,519,549 A | | 7/1970 | Grassmann et al. |
| 4,758,097 A | | 7/1988 | Iles, Sr. |
| 5,069,364 A | | 12/1991 | McGill |
| 5,229,150 A | | 7/1993 | Ahnell et al. |
| 5,349,825 A | * | 9/1994 | Duke et al. ............. 62/69 |

(Continued)

FOREIGN PATENT DOCUMENTS

| | | |
|---|---|---|
| CN | 1035090 | 8/1989 |
| CN | 1182545 | 5/1998 |

(Continued)

OTHER PUBLICATIONS

Coochi—U.S. Appl. No. 13/046,401, filed Mar. 11, 2011.

(Continued)

*Primary Examiner* — Dana Ross
*Assistant Examiner* — Brandon Harvey
(74) *Attorney, Agent, or Firm* — Timothy J. Klima; Shuttleworth & Ingersoll, PLC (57) ABSTRACT

A machine for making and dispensing semiliquid and/or semisolid food products includes a working unit equipped with a cylinder for processing a mixture of a basic product and air, a heat exchange fluid flow chamber located around the cylinder, a dispensing tap and a mechanism for treating and feeding the heat exchange fluid to the flow chamber, and a flexible container for containing the basic product. A peristaltic pump transfers the basic product from the container to the processing cylinder through a supply duct along which there is a first pressure sensor for the pressure of the mixture fed into the cylinder. The sensor sends a signal indicating the pressure of the mixture to a control and drive unit which adjusts the operation of the peristaltic pump and thus the output pressure of the pump.

22 Claims, 4 Drawing Sheets

(56) References Cited

U.S. PATENT DOCUMENTS

| | | | |
|---|---|---|---|
| 5,463,878 A * | 11/1995 | Parekh et al. | 62/394 |
| 5,473,909 A * | 12/1995 | Kateman et al. | 62/306 |
| 5,718,816 A | 2/1998 | Savage et al. | |
| 6,006,535 A | 12/1999 | Cathenaut | |
| 7,681,761 B2 | 3/2010 | Harra | |
| 8,479,531 B2 | 7/2013 | Maeda et al. | |
| 2003/0102854 A1 | 6/2003 | Gascoyne et al. | |
| 2004/0219269 A1 * | 11/2004 | Cathenaut et al. | 426/512 |
| 2007/0102448 A1 * | 5/2007 | Harra | 222/146.6 |
| 2007/0251260 A1 | 11/2007 | Baxter et al. | |
| 2008/0073376 A1 * | 3/2008 | Gist et al. | 222/145.5 |
| 2008/0226779 A1 | 9/2008 | Cocchi et al. | |

FOREIGN PATENT DOCUMENTS

| | | |
|---|---|---|
| CN | 1668508 | 9/2005 |
| CN | 1780785 | 5/2006 |
| CN | 101252858 | 8/2008 |
| EP | 0448503 | 9/1991 |
| EP | 1716760 | 11/2006 |
| EP | 1972198 | 9/2008 |
| EP | 2098729 | 9/2009 |

OTHER PUBLICATIONS

Italian Search Report dated Dec. 15, 2011 from counterpart foreign application.

Shi K et al: "Time Evolution of Double-Diffusive Convection in a Vertical Cylinder With Radial Temperature and Axial Solutal Gradients", International Journal of Heat and Mass Transfer, Pergamon Press, GB, vol. 49, No. 5-6, Mar. 1, 2006, pp. 995-1003, XP025238589, ISSN: 0017-9310, DOI: 10.1016/J.IJHEATMASSTRANSFER.2005.09.009.

Italian Search Report dated Nov. 17, 2010 from counterpart application.

Chinese Office Action dated Jun. 5, 2014 from counterpart application No. 21210164202.0.

\* cited by examiner

MACHINE FOR MAKING AND DISPENSING SEMILIQUID AND/OR SEMISOLID PRODUCTS

This application claims priority to Italian Patent Application BO2011A000165 filed Mar. 30, 2011, the entirety of which is incorporated by reference herein.

BACKGROUND OF THE INVENTION

This invention relates to a machine for making and dispensing semiliquid and/or semisolid food products such as, for example, soft ice cream and the like.

More specifically, this invention relates to machines for making ice cream where the basic product for making the ice cream is contained in a sealed container of soft plastic enclosed in cardboard box and commonly known by the term "Bag in Box".

Machines of this type for making and dispensing ice cream comprise a frame which mounts, at the top of it, an operating unit for making and dispensing the ice cream.

The operating unit comprises a cooling cylinder, commonly called mixing and freezing unit, inside which the basic product is processed. When the product is ready, it can be served through a dispensing tap which is usually mounted on the front of the machine frame.

These machines also comprise an intake pump which feeds the basic product from the sealed container through an intake pipe into the mixing and freezing cylinder.

More specifically, the pump—usually a mechanical gear pump—takes in a mixture of air and basic product and feeds it into the cylinder at a predetermined, preset pressure.

In order to keep the pressure at which the mixture is fed into the cylinder at the correct level, the prior art teaches the use of a by-pass valve which is located downstream of the gear pump and which, when the pressure of the mixture exceeds the value of the valve rating, opens and bypasses the cylinder by feeding the product for example into a recycling tank.

In another prior art solution for keeping the pressure at which the air and product mixture is fed into the cylinder at the correct level, a pressure sensor is placed on the base plate of the cylinder. This solution, however, is disadvantageous because it gives rise to problems of precision and cleaning and hence sanitization.

This type of problem also applies to gear pumps since these are very difficult to clean and sanitize.

Another disadvantage of these machines is due to the fact that the basic product consists of a highly perishable milk-based mix, which favors the growth of germs and bacteria, especially at the parts which come into direct contact with the basic product.

For example, the end of the intake pipe connected to the sealed container normally has a needle or tip for piercing the container itself. When an empty container is removed and changed for a new one, the needle comes into contact with the air, creating a possible site for bacterial growth, with the risk of contaminating the basic product in the new container.

These machines are therefore subjected to frequent checks and preventive maintenance in order to guarantee perfect hygiene conditions along the entire feed circuit.

These needs are connected directly with the difficulty of disassembling the above mentioned pumps of the prior art type.

Maintenance operations of this type, however, cannot guarantee conditions of total product hygiene.

Although methods for estimating the cell mass of a bacterial population exist, these methods involve laboratory tests, high costs and extended times and are used, for example in the dairy industry, only in random testing.

SUMMARY OF THE INVENTION

This invention therefore has for an aim to provide a machine for making and dispensing semiliquid and/or semisolid food products which overcomes the disadvantages mentioned above with reference to the prior art machines.

The technical purpose indicated and the aims specified are substantially achieved by a machine comprising the technical features described in one or more of the accompanying claims.

BRIEF DESCRIPTION OF THE DRAWINGS

Further features and advantages of the invention are more apparent in the detailed description below, with reference to a preferred, non-limiting embodiment of a machine for making and dispensing semiliquid and/or semisolid food products, illustrated in the accompanying drawings, in which.

DESCRIPTION OF THE PREFERRED EMBODIMENTS

Figure 1:
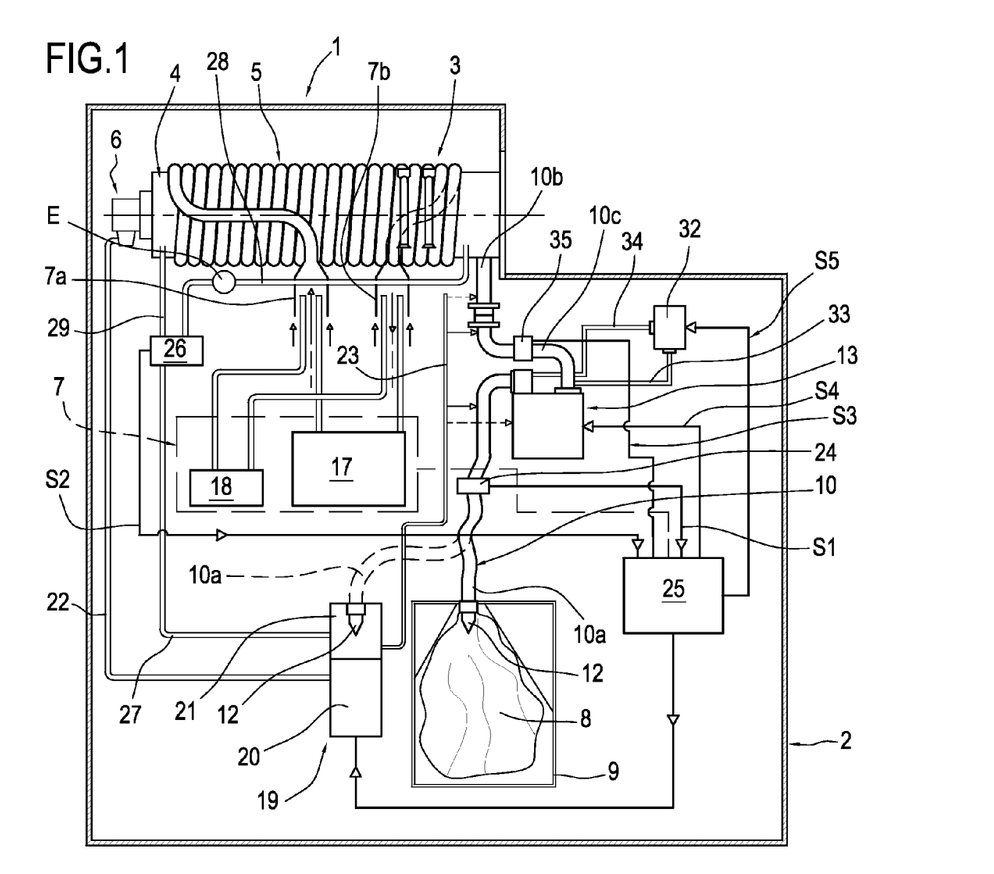
FIG. 1 schematically illustrates a machine according to the invention.

As shown in FIG. 1, the numeral 1 denotes in its entirety a machine for making and dispensing semiliquid and/or semisolid food products comprising a frame 2 supporting an operating unit 3 for processing at least one mixture of a basic product and air, for making and dispensing the products. The operating unit 3 comprises a processing cylinder or mixing and freezing cylinder 4 for the mixture, a heat exchange fluid flow chamber 5 located around the cylinder 4, a dispensing tap 6 and means 7 for treating and feeding the heat exchange fluid to the flow chamber 5 and having an inlet 7a and an outlet 7b for the heat exchange fluid.

The machine further comprises a flexible or soft container 8 containing the basic product and housed inside a hard container 9. The assembly made up of the soft container 8 and the hard container 9 is generally known by the term "Bag in Box".

A supply duct 10 for delivering the basic product to the processing cylinder connects the soft container 8 to the mixing and freezing cylinder 4.

The supply duct 10 comprises a first portion, a second portion and a third portion, labeled 10a, 10c and 10b, respectively, connected to each other by a separable connector. More specifically, the first portion 10a is connected to the flexible container 8, while the second portion 10c is connected to the cylinder 4.

The first portion 10a has, at the end of it which connects to the soft container, means 12 for piercing the container 8. Advantageously, these piercing means comprise a needle or tip 12 adapted to pierce the container 8 so as to allow the basic product to flow into the supply pipe 10.

The machine 1 also comprises a peristaltic pump 13 connected to the supply duct and designed to transfer the basic product from the container 8 to the processing cylinder 4.

Figure 2:
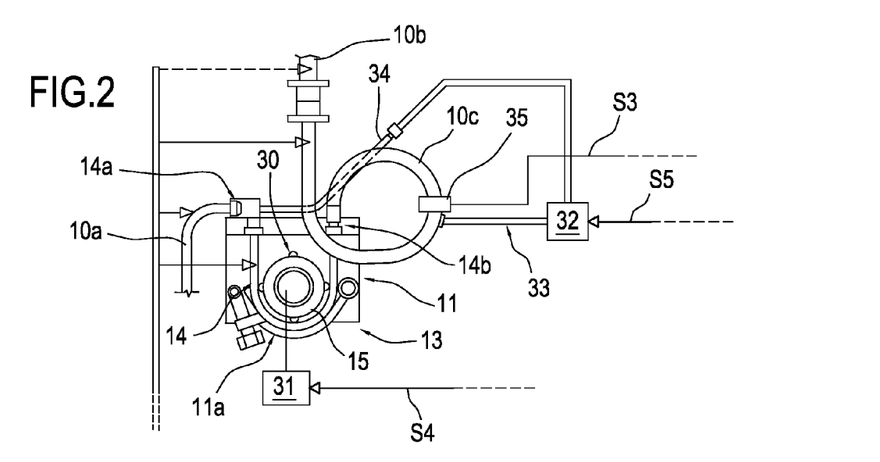
FIG. 2 is a schematic scaled-up view of a detail of the machine of FIG. 1.

The peristaltic pump 13 may be made as described and illustrated in European patent publication EP 2 098 729 in the name of the same applicant as this invention and which is hereby incorporated by reference. As illustrated in FIG. 2, the peristaltic pump 13 comprises a main casing 11 and an abutment casing 11a slidably connected to the main casing 11. A hose 14 of flexible material is placed between the main casing 11 and the abutment casing 11a. The hose 14 allows a fluid to be pumped from an intake section 14a to a delivery section 14b. The peristaltic pump 13 also comprises a rotor 15 which is rotatably connected to the main casing 11 and which mounts a plurality of rollers 30. The rotor 15 turns about its own axis of rotation and each roller 30 is angularly equispaced from the others.

The rotor 15, set in rotation by drive means which are schematically represented as a block 31, causes the rollers 30 to follow a circular trajectory which, for someone looking at FIGS. 1 and 2, may be clockwise or anticlockwise. The rotor 15 (which, in the case of intake from the soft container 8, rotates clockwise) rotationally drives the rollers 30 in such a way as to translate the respective occlusions of the hose 14 from the intake section 14a to the delivery section 14b. That way, a portion of fluid contained between two successive occlusions of the hose 14 is transported from the intake section 14a to the delivery section 14b.

Generally speaking, inside the mixing and freezing cylinder 4 there is a helical stirrer, not illustrated in the drawings, which mixes the basic product with the air contained inside the selfsame cylinder 4.

Advantageously, air can be added to the basic product before it reaches the mixing and freezing cylinder 4. That way, the basic product/air proportions of the mixture can be controlled.

As shown in FIGS. 1 and 2, air can be fed in by connecting the output of an air compressor 32 to the intake of the peristaltic pump 13 and/or directly to the second portion 10c of the supply pipe 10, located between the outfeed end of the peristaltic pump 13 and the cylinder 4.

That way, a fraction of pressurized air flow generated by the compressor 32 is conveyed directly into the second portion 10c of the supply pipe 10 through the output 33 of the compressor 32, or to the hose 14 of the peristaltic pump 13 through the output 34 of the selfsame compressor 32 in order to produce the mixture fed into the mixing and freezing cylinder 4.

In an alternative embodiment, the basic product and the air are mixed through the agency of at least one Venturi tube 36.

Figure 3:
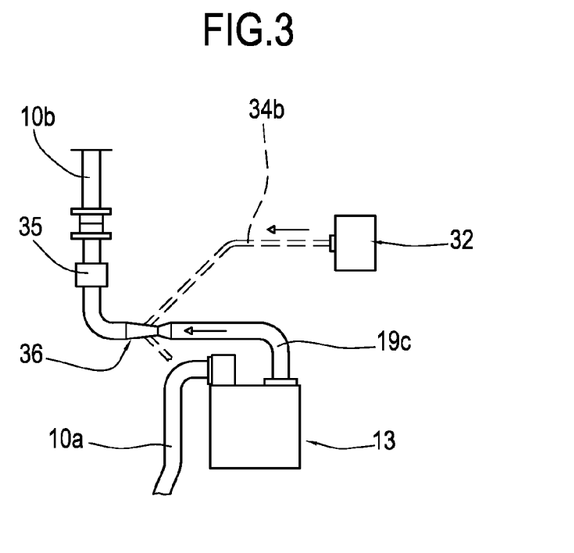
FIG. 3 schematically illustrates the detail of FIG. 2 according to a second embodiment.

More specifically, as shown in FIG. 3, the outfeed end of the peristaltic pump 13 at the second portion 10c of the supply pipe 10, or alternatively, the intake of the pump 13 at the first portion 10a of the pipe 10, can be connected to a Venturi tube 36 directed according to the flow of the basic product feeding out of the pump 13.

Figure 4:
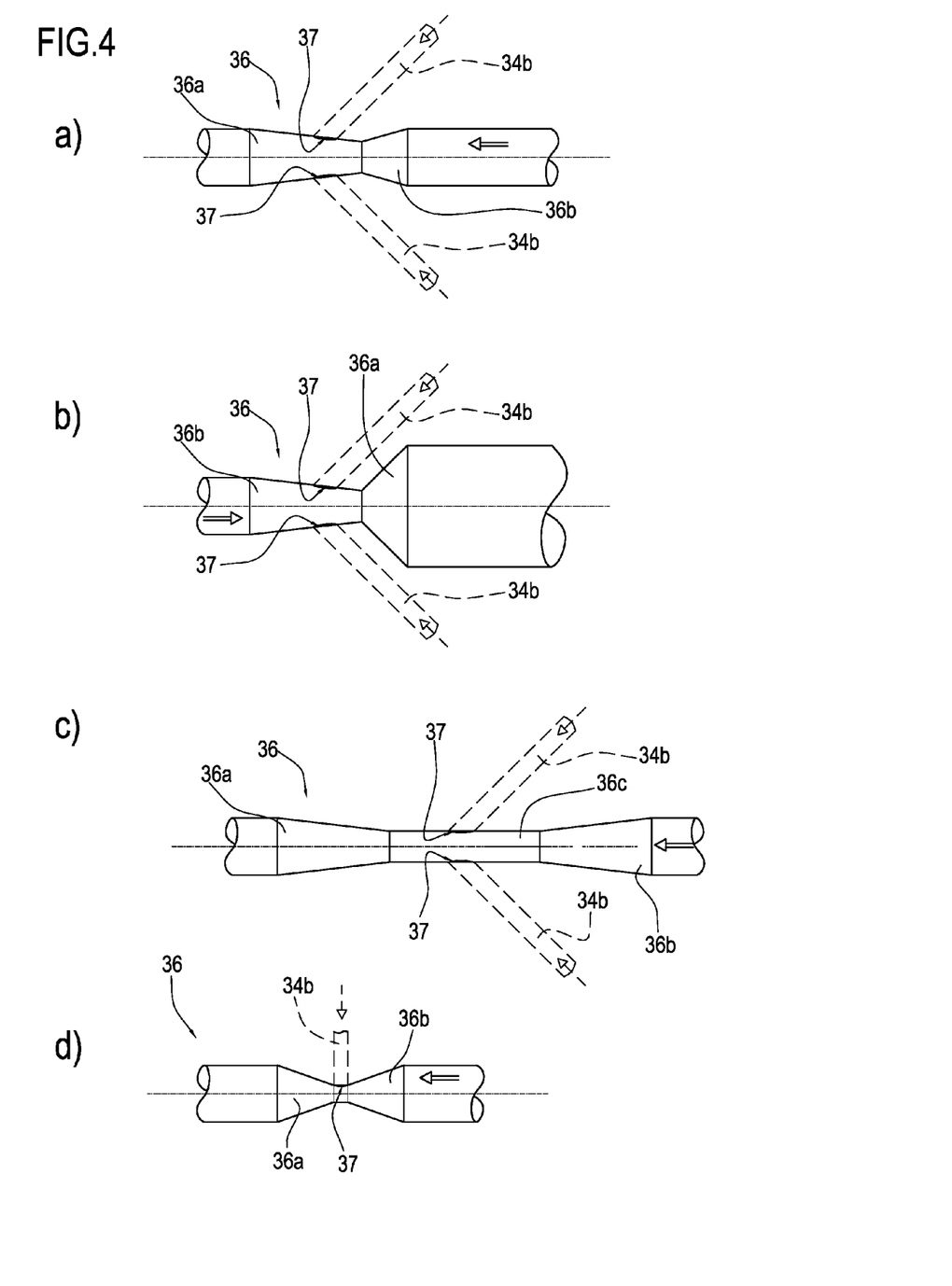
FIGS. 4a, 4b, 4c, 4d are schematic scaled-up views of four variants of a detail from FIG. 3.

As illustrated in FIG. 4a, at the divergent portion of it 36a, which diverges in the direction of flow of the basic product, the Venturi tube 36 has at least one airflow inlet 37.

The inlet is preferably located at the divergent portion 36a of the Venturi tube 36.

During expansion of the basic product, a negative pressure is created in the divergent portion 36a, such as to suck air into the tube 36 through the inlet 37.

That way, during expansion of the basic product at the divergent portion 36a, air can be incorporated in the basic product in order to obtain a smoother mix feeding into the cylinder 4. Also, the air is drawn directly from the outside atmosphere, spontaneously and without the use of additional air supply means.

The air may also be fed into the tube 36 through a connection of the inlet 37 with the above mentioned compressor 32.

In this case, through a duct 34b connecting the inlet 37 to the compressor 32, air under pressure can be fed into the Venturi tube 36, thereby improving the effect of homogenizing the mixture during mixing of the basic product with the air.

With reference in particular to FIGS. 4b to 4d, the Venturi tube 36 may have different shapes, depending on the flow rate of the basic product passing through it and the required degree of mixing between basic product and air.

More specifically, in FIG. 4b, the air is fed in at the convergent portion 36b of the tube 36, according to the flow of the basic product; in FIG. 4c, the air is fed in at a stretch 36c with a constant section, between the convergent portion 36b and the divergent one 36a; in FIG. 4d, the air is fed in at the point of connection of the convergent portion 36b with the divergent portion 36a.

In a further embodiment, mixing is accomplished through the use of at least one hydro pneumatic lift 38.

Figure 5:
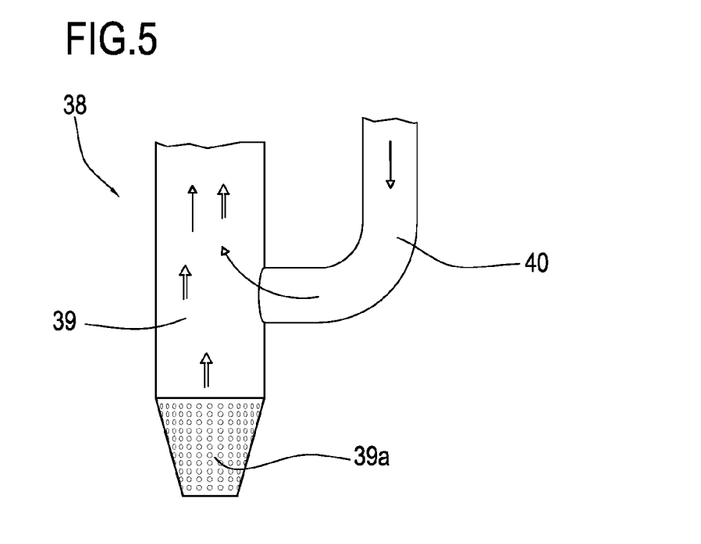
FIG. 5 is a schematic scaled-up view of the detail of FIG. 2 according to a third embodiment.

These devices, also known as "air lifts", consist, according to one known embodiment shown in FIG. 5, of a first duct 39, a first end of which 39a is immersed in the intake liquid or material, and a second duct 40, connected to the first duct 39 substantially at the first end 39a, in order to feed an air flow into the first duct 39.

The operating principle is substantially that of lifting the intake liquid by lowering the specific weight of the liquid itself inside the first duct 39 compared to the liquid outside it.

Advantageously, this principle makes it possible not only to achieve the main effect of lifting the intake liquid but also that of mixing the intake liquid in the first duct 39 with the air fed in through the second duct 40. For the purposes of this invention, therefore, the lift 38 can be used to obtain a mixture of basic product and air at the infeed end of the cylinder 4, with the added advantage of also promoting its influx through the supply pipe 10.

Figure 6:
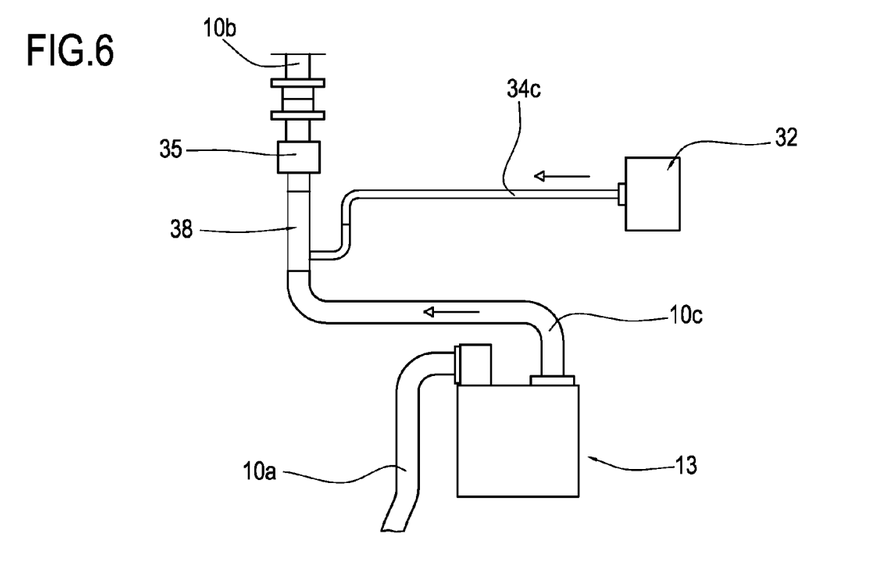
FIG. 6 schematically illustrates the detail of FIG. 2 according to the third embodiment.
Figure 7:
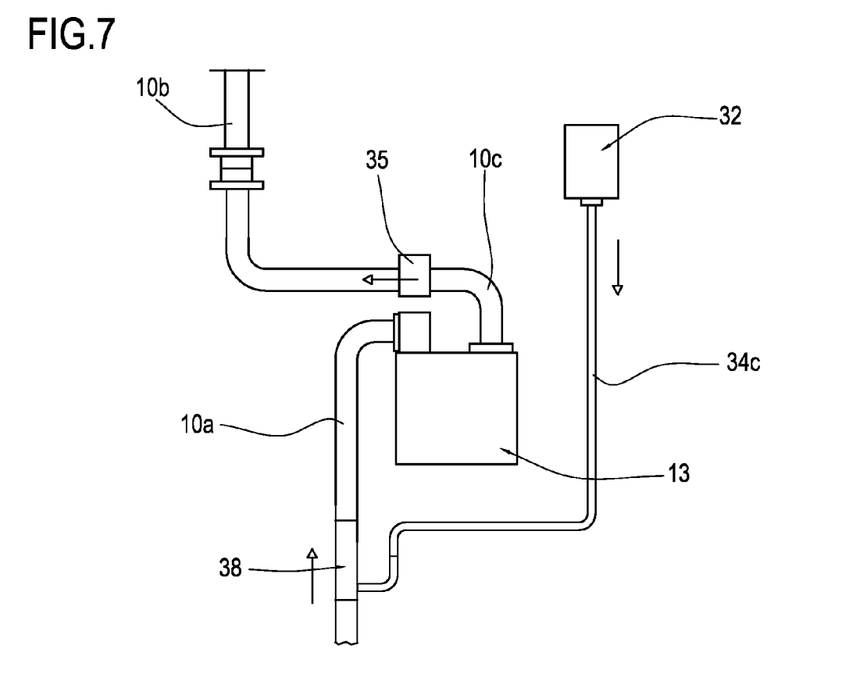
FIG. 7 schematically illustrates a variant of the third embodiment of the detail of FIG. 2.

The lift 38 is mounted downstream of the peristaltic pump 13 at the second portion 10c of the supply pipe 10 (FIG. 6). Alternatively, the lift 38 is mounted upstream of the pump 13 at the first portion 10a of the supply pipe 10 (FIG. 7). More specifically, the second duct 40 is connected to the compressor 32 through the duct 34c.

Advantageously, in order to control the pressure at which peristaltic pump 13 feeds the air-basic product mixture into the cylinder 4, the machine 1 comprises a first pressure sensor 35, located along the second pipe portion 10c. The sensor 35 is mounted outside the pipe portion 10c, which is made of a flexible material. That way, the sensor 35 can measure the pressure of the air-basic product mixture which is flowing through the supply pipe 10 and can send a signal S3 indicating the measured pressure value to a control and drive unit 25 which processes the signal in such a way as to check that the value of the pressure is correct relative to a preset value.

If the pressure value is not within a predetermined range, the unit 25 can in turn send a first signal S4 directly to the peristaltic pump 13 and, more precisely, to its drive means 31 in order to adjust the speed of rotation of the rotor 15. At the same time, the unit 25 can send a second signal S5 to the compressor 32 to adjust the flow of air to be fed directly into the pump 13 or into the second portion 10c of the pipe 10 in order to adjust the quantity of air contained in the mixture.

In the same way, in alternative embodiments, the second signal S5 adjusts the air flow to be fed into divergent portion 36a of the Venturi tube 36, when the latter is connected to the compressor 32, or into the first duct 39 of the lift 38 through the second duct 40 of the lift 38 itself.

In short, a feedback control system is created which can adjust both the pressure and quantity of air in the mixture which is fed into the cylinder 4.

It should be noted that the pressure sensor 35, being mounted on the outside, is easy to access for routine maintenance and is not difficult to clean and sanitize.

The means 7 for treating and feeding the heat exchange fluid, represented schematically in their entirety inside a block 7 drawn with a dashed line, comprise, in the first preferred embodiment, a refrigerating circuit 17, to create a fluid for cooling the mixture inside the processing cylinder 4, and a heater 18 to create a fluid for heating the mixture.

More specifically, the infeed and outfeed ends of the refrigerating circuit 17 are connected to the infeed and outfeed ends of the flow chamber 5, respectively. The same applies to the infeed and outfeed ends of the heater.

The refrigerating system 17, of known type, generally comprises a motor-driven compressor, a condenser and an evaporator, and a piping system in which the cooling fluid flows.

The heater 18, on the other hand, may comprise a boiler and the related circuit within which a heating fluid flows. Advantageously, the heating fluid may comprise air or water.

The machine 1 further comprises sanitizing means 19 for cleaning and sanitizing the devices and components of the machine 1 itself which come into contact with the basic product or the mixture.

These means are designed to clean and eliminate any residue of basic product and/or mixture remaining inside the components. For example, the product residue inside the mixing and freezing cylinder 4 must be removed before starting another production cycle.

Also, any product remaining inside the supply duct or pipe 10 may go bad, upon contact with the air, thus contaminating the next product batch.

For this reason, it is advantageously useful to clean the different parts with a sanitizing fluid generated and distributed by the sanitizing means 19. Preferably, the fluid may comprise steam with a high water content, since steam is easy to produce and can easily be made to flow through all the ducts, whilst the high water content makes it possible to thoroughly and correctly clean in particular the mixing and freezing cylinder 4, avoiding the formation, within the residual product, of channels which would allow the steam to escape, thus preventing its cleaning action.

Alternatively, a mild, low-foaming detergent can be used as the sanitizing fluid.

These sanitizing means, schematically represented as a block 19 in the drawing, comprise a sanitizing fluid generator 20 and a sanitizing chamber 21.

The sanitizing fluid generator 20 comprises a boiler for producing steam, not illustrated or described in detail since it is of known type.

The sanitizing chamber 21 is substantially a chamber for receiving the components to be sterilized and from it there extend pipes for delivering the sanitizing fluid to the components concerned. In particular, the chamber 21 is adapted to receive the means 12 for piercing the flexible container 8.

More specifically, when the flexible container 8 is changed because the basic product it contains is finished, the supply pipe 10 is disconnected from the container and with it the piercing means 12. To prevent the contact with the air, however brief, from triggering bacteria growth, the pipe 10 and in particular the piercing means 12 are placed in the sanitizing chamber 21.

Since the chamber is connected directly to the generator 20, it fills with sanitizing fluid, that is, in the preferred embodiment, steam. The piercing means 12, and hence the needle they are provided with, come into contact with steam at a high temperature and are thus sterilized, since any bacteria that may have developed is destroyed. The piercing means and the needle may advantageously remain inside the sanitizing chamber until they can be fitted to a new flexible container. Another advantageous aspect is that the piercing means remain in contact with the sterilizing fluid for a predetermined length of time, thus guaranteeing correct sanitization.

The sanitizing means 19 are intended mainly to clean the mixing and freezing cylinder 4 and the pump 13.

The pump can be easily sanitized by making the steam generated by the boiler 20 flow along the pipe 10 or by using a secondary pipe. In effect, the sanitizing means and, in particular, the chamber 21, comprise delivery pipes, labeled 22 and 23, so that all the components desired can be cleaned and sanitized. For example, one of the pipes can be used to connect the sanitizing chamber and the dispensing tap, so that the latter can be sterilized when required. Further, if only the pipe 10 has to be sanitized, without allowing fluid to flow into the cylinder 4, the pipe 23 may be used, since it leads both to the pipe portion 10a and to the pipe portion 10b, as well as directly into the hose 14 of the peristaltic pump 13.

The machine is also equipped with a second sensor 24, for controlling the flow rate of the basic product fed to the processing cylinder 4.

The sensor 24 is preferably mounted on the first portion 10a of the supply pipe 10 and allows measurement of the flow rate of the basic product or mixture flowing in the selfsame pipe.

The sensor 24 may advantageously be a flow rate sensor. Alternatively, it may be a pressure sensor.

If a flow rate sensor is used, it is mounted inside the duct.

If a pressure sensor is used, on the other hand, it is mounted outside the duct. More specifically, however, the pressure sensor must be mounted at a stretch of the duct made of flexible material.

The duct or pipe 10 may be made of a rigid material or a flexible material, or both. Advantageously, if a pressure sensor is used, it may be convenient to provide the duct with a stretch made of flexible material long enough for optimum operation of the sensor.

The sensor 24 measures the flow rate of the fluid and generates an output signal S1 indicating the measured flow rate.

The signal is then sent to a control and drive unit 25 which processes the signal in such a way as to check that the value of the pressure is suitable for correct operation. More specifically, the unit 25, based on the information content of the signal S1, regulates the flow rate of the basic product by adjusting the peristaltic pump 13 and the compressor 32.

In effect, the control and drive unit 25 is connected to the drive means 31 which control the speed of rotation of the rotor 15 based on the flow rate value supplied to it in real time by the sensor 24. Also, by adjusting the compressor 32, the unit 25 adjusts the pressure of the air forced into the hose 14 of the pump 13 or of the pipe 10 directly. Further, if the sensor 24 provides the unit 25 with information relating to the flow rate of the mixture, the unit 25 can also adjust the ratio between the basic product and the mixture. More specifically, the unit 25, by controlling the motor-driven compressor, can also control the amount of air that is fed into the pipe 10, thereby advantageously controlling the mixture fed into the mixing and freezing cylinder 4.

The machine 1 also comprises a device 26 for detecting the bacterial charge contained in the mixture inside the processing cylinder 4.

As stated above, the cleaning of the machine 1 and its components, in particular the processing cylinder 4, follows a scheme of preventive operations based on a periodic maintenance schedule.

Since a periodic maintenance schedule is not by itself a guarantee that the presence of bacteria will be correctly reduced or eliminated, it is also the practice to make an estimate of the bacterial population based on mixture sampling, also periodic. These samplings, however, are based on analysis methods which are expensive and highly time-consuming.

It is therefore advantageous to provide the machine with a device 26 for detecting the bacterial charge in the mixture, possibly continuously.

The device 26 is of known type and is the object of prior Italian patent application No. BO2010A000233 in the name of the same applicant as this invention and which is hereby incorporated by reference and therefore not described in detail here.

The device 26 comprises an inlet and an outlet connected to a first end and a second end of the cylinder 4, respectively.

Generally speaking, devices of this kind provide an analysis of the bacterial charge by analyzing the product flowing through them. For that reason, in the preferred embodiment illustrated, the device is connected to the processing cylinder by way of two ducts 28 and 29.

More specifically, the duct 28 feeds a sample of mixture drawn from the cylinder 4 and comprises a mixture intake pump E. The pump, preferably operating continuously, draws a small portion of mixture and feeds it into an analysis chamber, not illustrated, of the device.

This creates in the analysis chamber a flow of mixture which is analyzed and made to flow out of the device and into the cylinder again.

The device 26 collects the information regarding the bacterial charge of the mixture and, depending on that information, generates a signal S2 which it sends to the control and drive unit 25.

Preferably, the signal S2 defines a first parameter indicating the bacterial charge in the mixture. The unit 25 compares the first parameter with a second predetermined safety parameter based on the bacterial charge considered acceptable and according to the result of the comparison, adjusts the means for feeding the heat exchange fluid.

If the first parameter is greater than the second safety parameter, the unit 25 drives the heater 18 of the feed means 7 in order to heat the mixture inside the processing cylinder 4, in order to reduce the bacterial charge in the mixture by pasteurizing the mixture.

If the first parameter is less than the second safety parameter, on the other hand, the unit 25 drives the refrigerating circuit 17 to cool the mixture in such a way as to mix and freeze the mixture to proceed with production.

Advantageously, the detection device 26 may be connected by way of a connecting duct 27 to the sanitizing means 19, in particular to the sanitizing chamber 21. More specifically, the control and drive unit 25 also controls the cleaning of the device 26 through a command issued to the sanitizing means 19, which accordingly feed the sanitizing fluid to the device 26 by way of the connecting duct 27.

What is claimed is:

1. A machine for making and dispensing at least one chosen from semiliquid and semisolid food products comprising:
   a working unit equipped with a processing cylinder for processing a mixture of a basic product and air into the food products,
   a heat exchange fluid flow chamber located around the processing cylinder,
   a dispensing tap for dispensing the food products from the processing cylinder,
   a system for treating and feeding heat exchange fluid to the flow chamber;
   a flexible container for containing the basic product;
   a supply duct for supplying the mixture of basic product and air to the processing cylinder,
   a peristaltic pump connected to the supply duct and configured to transfer the basic product from the container to the processing cylinder,
   a control and drive unit;
   a first pressure sensor located along the supply duct downstream of the peristaltic pump for detecting a first pressure at which the mixture is fed into the processing cylinder and sending to the control and drive unit a first signal indicating the first pressure; the control and drive unit programmed to send at least one output signal for adjusting the peristaltic pump;
   a mechanism for generating a flow of air under pressure flowingly connected to an infeed end of the peristaltic pump to add air to the basic product to form the mixture of basic product and air;
   the control and drive unit being programmed to determine whether the first pressure is outside a predetermined range, and if so:
   the at least one output signal includes a second signal for adjusting a speed of rotation of the peristaltic pump; and
   the control and drive unit is programmed to send a third signal to adjust the flow of air to the infeed end of the peristaltic pump to adjust a quantity of air contained in the mixture of basic product and air.

2. The machine according to claim 1, comprising at least one Venturi tube, located at the infeed end of the peristaltic pump; the tube having at least one inlet for feeding air in from the outside.

3. The machine according to claim 2, wherein the mechanism for generating a flow of air under pressure is connected to the Venturi tube.

4. The machine according to claim 1, wherein the mechanism for generating a flow of air under pressure is connected to at least one hydro pneumatic lift; the lift being located upstream of the peristaltic pump.

5. The machine according to claim 1, wherein the supply duct comprises a first portion, a second portion and a third portion, the second portion and the third portion being connected to each other by a separable connector; the first portion being connected to the flexible container and the third portion being connected to the processing cylinder; the second portion being connected to the third portion through the peristaltic pump.

6. The machine according to claim 5, comprising a second sensor mounted along the supply duct, configured to generate and send to the control and drive unit a signal indicating a flow rate of the basic product; the control and drive unit programmed to act on the peristaltic pump to adjust the flow rate of the basic product measured by the second sensor.

7. The machine according to claim 5, comprising a second sensor mounted along the supply duct, configured to generate and send to the control and drive unit a signal indicating a flow rate of a mixture of basic product and air; the control and drive unit programmed to act both on the peristaltic pump and on the mechanism for generating a flow of air under pressure to adjust the flow rate of the mixture according to the mixture flow rate value measured by the sensor.

8. The machine according to claim 6, wherein the second sensor is a flow rate sensor.

9. The machine according to claim 8, wherein the flow rate sensor is mounted inside the first portion of the supply duct.

10. The machine according to claim 6, wherein the second sensor is a pressure sensor.

11. The machine according to claim 10, wherein the second sensor is mounted outside the first portion of the supply duct at a stretch of flexible material of the first portion.

12. The machine according to claim 1, wherein the system for treating and feeding the heat exchange fluid comprises a refrigerating circuit to create a fluid for cooling the mixture inside the processing cylinder, and a heater to create a fluid for heating the mixture.

13. The machine according to claim 12, comprising a device for detecting a bacterial charge of the mixture inside the processing cylinder.

14. The machine according to claim 13, wherein the device for detecting the bacterial charge sends to the control and drive unit a signal defining a first parameter indicating the bacterial charge of the mixture; the control and drive unit programmed to adjust the system for treating and feeding the heat exchange fluid based on a comparison of the first parameter with a second predetermined safety parameter.

15. The machine according to claim 14, wherein, if the first parameter is greater than the second safety parameter, the control and drive unit is programmed to drive the heater to heat the mixture inside the processing cylinder, in order to reduce the bacterial charge in the mixture through pasteurization; and if the first parameter is less than the second safety parameter, the control and drive unit is programmed to drive the refrigerating circuit to cool the mixture.

16. The machine according to claim 1, comprising a sanitizing mechanism.

17. The machine according to claim 16, wherein the sanitizing mechanism comprises a sanitizing fluid generator.

18. The machine according to claim 17, wherein the sanitizing mechanism sanitizes the processing cylinder by feeding sanitizing fluid into the processing cylinder through the supply duct.

19. The machine according to claim 17, wherein the sanitizing mechanism sanitizes a device for detecting a bacterial charge by feeding sanitizing fluid through a duct into the device for detecting a bacterial charge.

20. The machine according to claim 17, wherein the sanitizing fluid comprises steam.

21. The machine according to claim 17, wherein the sanitizing fluid comprises water containing a detergent.

22. A machine for making and dispensing at least one chosen from semiliquid and semisolid food products comprising:
   a working unit equipped with a processing cylinder for processing a mixture of a basic product and air into the food products,
   a heat exchange fluid flow chamber located around the processing cylinder,
   a dispensing tap for dispensing the food products from the processing cylinder,
   a system for treating and feeding heat exchange fluid to the flow chamber;
   a flexible container for containing the basic product;
   a duct for supplying the mixture of basic product and air to the processing cylinder,
   a peristaltic pump connected to the supply duct and configured to transfer the basic product from the container to the processing cylinder,
   a first pressure sensor located along the supply duct downstream of the peristaltic pump and configured to send to a control and drive unit a signal indicating a pressure at which the mixture is fed into the processing cylinder; the control and drive unit sending as output at least one signal for adjusting the peristaltic pump;
   a hydro pneumatic lift located at at least one chosen from upstream of the peristaltic pump and downstream of the peristaltic pump;
   a mechanism for generating a flow of air under pressure connected to the hydro pneumatic lift.

\* \* \* \* \*